Nov. 6, 1923.
H. C. ELLIOTT
1,472,904
WINDSHIELD LIGHT SHADE FOR AUTOMOBILES
Filed June 9, 1922
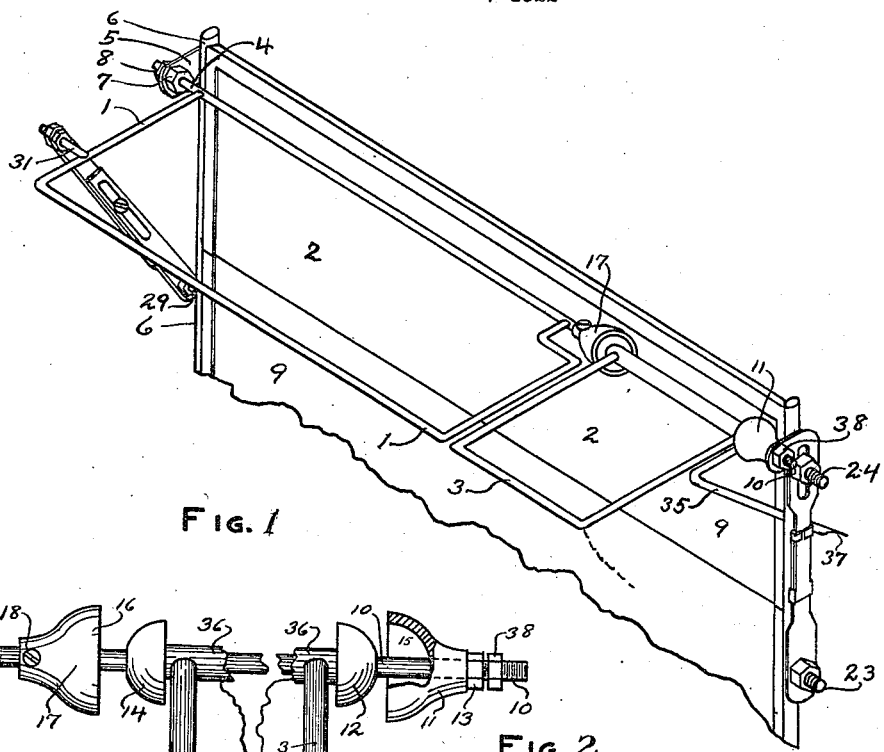
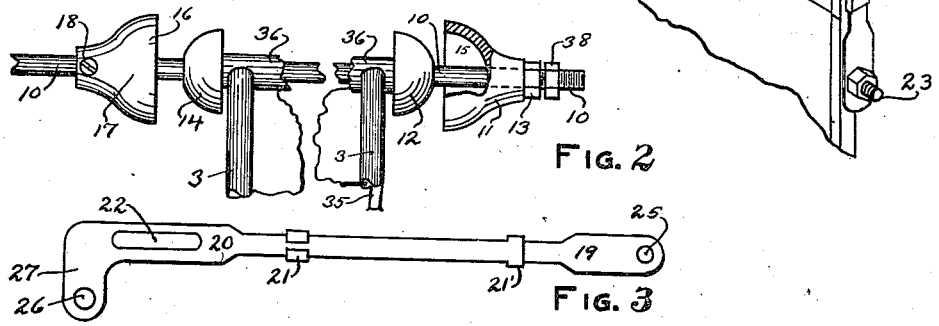
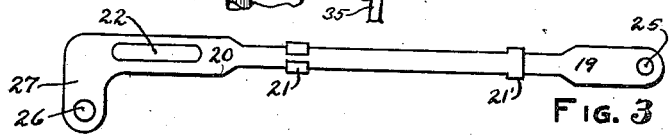
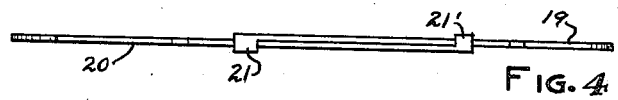
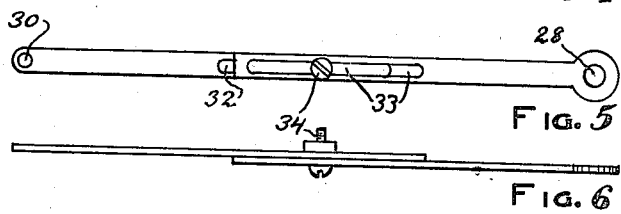
Harry C. Elliott INVENTOR.
BY
U. G. Charles
ATTORNEY.

Patented Nov. 6, 1923.

1,472,904

UNITED STATES PATENT OFFICE.

HARRY C. ELLIOTT, OF TOWANDA, KANSAS.

WINDSHIELD LIGHT SHADE FOR AUTOMOBILES.

Application filed June 9, 1922. Serial No. 567,088.

*To all whom it may concern:*

Be it known that I, HARRY C. ELLIOTT, a citizen of the United States, and a resident of Towanda, in the county of Butler and the State of Kansas, have invented certain new and useful Improvements in a Windshield Light Shade for Automobiles, of which the following is a specification.

My invention relates to a sun, or other bright light, shade, to be attached to an automobile wind shield frame, and has, for its particular object, a shade that is made in two parts independently operated, and to act as a sun shade or a shield against bright lights.

The following is a description of my invention, reference being had to the drawings, in which Figure 1 is a perspective view showing all parts assembled in operative position.

Figure 2 is a detailed view of the frictioning members for frame 3.

Figure 3 is a side view of the adjustable hanger to which said shield is trunnioned.

Figure 4 is an edge view of Figure 3.

Figure 5 is an adjustable brace arm, and Figure 6 is an edge view of Figure 5.

In Figure 1, 1 is the frame supporting a sheet, 2; said sheet being of translucent or opaque material, as desired.

3 is a frame supporting a smaller section of the shield which contains a sheet member same as 2 in frame 1.

4 is an extension arm on frame 1 which trunnions in a supporting bar, 5; said bar being attached to the automobile windshield frame, 6.

7 and 8 are jam nuts holding the shade in proper relation to the wind shield, 9.

10 is an extension rod functioning the same as 4 on the opposite side, and on said rod is mounted friction elements 11 and 12, 11 being threaded and screwed to proper position and fastened by a jam nut, 13. It will be understood that the extension rods 10 and 4 referred to extend across the side of the shade and on said rods, slidably mounted, is the frame 3; said frame having spherical friction members 12 and 14; said members adapted to friction in sockets 15 and 16.

17 is the socket rigidly attached to shaft 10 by means of a set screw 18, and frame 1 is tensioned between said sockets 11 and 17 by action of socket 11 screwing against said bearing 12, as heretofore described.

Figure 3 is composed of two parts, 19 and 20; said parts adapted to slide in the clinched ends as shown at 21 and 21'; said clinched ends holding the bars in perfect alignment.

22 is a slot means for adjustment for the varying positions of bolts 23 and 24 which are in use on the present make of automobile wind shields. The hole, 25, is adapted to engage with bolt 23, and the slot 22 will engage with bolt 24, at which point an adjustment may be made for the correct position of the light shade relative to the extending portion of the top of the automobile.

26 is the hole in which the light shade rod 10 is trunnioned.

The object of the right angled extension of bar 20 as shown at 27 is to accommodate the diameter of the pivoted friction bearings 11 and 17.

Figure 5 is a brace arm, composed of two parts, each part having perforated ends and the opposite ends slotted.

Perforation 28 is adapted to engage with a bolt, 29, which is a corresponding element to bolt 23 on the opposite side.

Perforation 30 is adapted to engage with an extension rod on frame 1, as shown at 31; said rod being threaded and having jam nuts to hold said brace in proper position.

Slots 32 and 33 are adapted to receive a bolt, 34, functioning as a binder for any position that said brace may be placed; said brace arm may be kept in perfect alignment under ordinary positions of the light shield, but when brought to a low angle the arm will break as pivoted joint allowing said shield to rest in a parallel position with the wind shield proper.

Figure 35 is an arm rigidly attached to frame 3, a portion of which is sleeved on rod 10, as shown at 36 in Fig. 1; said arm being bent to an acute angle for convenience of rotating without obstruction; said arm 35 is adapted to extend through between the wind shield and the wind shield frame, and is operated by taking hold of the flattened end at 37, manipulating it with an upward and downward movement, and to hold said shield firmly on that portion of the frame marked 20 the rod 24 is passed through the hole 26 and the jam nut 38 is tightly screwed to place, clamping the member 27 tightly between said nuts.

To operate my invention for sun shade, both parts will be placed in one plane and set at an angle similar to that shown in Figure 1, or lowered to suit the angle of the sun light.

When driving after night the shade will be placed at a horizontal position and when meeting another car the operator will lower the small section of the shade marked 3, manipulating it with the lever, 35, drawing the shield to a vertical position, which will shade the eyes from the advancing automobile light.

If the frame 3 should be glazed with colored glass, the glare of the light will be retarded, and if it be filled with an opaque material the operator will be enabled to see the side of the road and keep the eyes shaded from the bright light, and when the approaching cars have passed the shade may be erected to a horizontal position and held in place by friction contact, as heretofore described.

I do not confine myself to any particular filler for the frames as colored glass or celluloid may be used, or sheet metal or asbestos board, or other opaque material may be employed, and said material held firmly in place is shown in Figure 2.

I do not wish to confine the friction element to a spherical body, as shown, as it may be made conical or disk form.

Such modifications may be made in the construction as lies within the appended claim.

Having thus described my invention, what I claim is new, and desire to secure by Letters Patent, is:

In a light shade for automobiles, the combination of a wind shield, a shade pivotally mounted thereon, said shield comprising two members, means for supporting said shade in a fixed position, a minor portion of said shade having a sleeve by which means said shade member being axially mounted on a shaft, said shaft having sockets, one of which is rigidly attached and the opposite socket is threaded on said shaft for adjustment and tensioning when engaged with pivots on said minor shade frame, and means for locking said sockets in a fixed position, an arm attached to sleeve of said shade and extending rearward within reach of operator, for the purpose set forth and described.

HARRY C. ELLIOTT.